United States Patent [19]

Miyazaki et al.

[11] Patent Number: 4,834,201

[45] Date of Patent: May 30, 1989

[54] ELECTRICAL POWER STEERING APPARATUS

[75] Inventors: Hiroya Miyazaki; Isamu Chikuma, both of Maebashi; Yasuhiko Miyaura, Gumma, all of Japan

[73] Assignee: Nippon Seiko Kabushiki Kaisha, Tokyo, Japan

[21] Appl. No.: 169,860

[22] Filed: Mar. 18, 1988

[30] Foreign Application Priority Data

Mar. 19, 1987 [JP] Japan ............................ 62-62456
Mar. 19, 1987 [JP] Japan ............................ 62-39149[U]

[51] Int. Cl.$^4$ .................................. B62D 5/04
[52] U.S. Cl. ............................ 180/79.1; 180/142
[58] Field of Search ............... 180/79.1, 142, 141, 180/143

[56] References Cited

U.S. PATENT DOCUMENTS 4,532,567  7/1985  Kade ................................ 180/79.1
4,556,116  12/1985  O'Neil ............................ 180/79.1
4,681,183  7/1987  Oshita ............................ 180/79.1

*Primary Examiner*—David M. Mitchell
*Assistant Examiner*—Donn McGiehan
*Attorney, Agent, or Firm*—Basile and Hanlon

[57] ABSTRACT

A neutral condition discriminating circuit is connected to a steering torque detector and it discriminates whether a torque detection value of the steering torque detector is in a neutral condition or not, that is, whether it is substantially zero or not. When it is discriminated that the non-neutral condition of the torque detection value continues for a predetermined time, a motor output decreasing circuit decreases a current supplied to a motor which produces a steering assisting torque in accordance with the torque detection value. The hysteresis characteristic of the steering torque detector, which causes the non-neutral condition to occur even when the steering wheel is not steered, can be compensated for by reducing the steering assisting torque produced by the rotor.

5 Claims, 5 Drawing Sheets

ELECTRICAL POWER STEERING APPARATUS

BACKGROUND OF THE INVENTION

1. Field of the Invention

The present invention relates to an electrical power steering apparatus having a motor which produces a steering assisting torque in accordance with a steering torque of a steering wheel, and in particular to an improved electrical power steering apparatus.

2. Description of the Prior Art

A prior art electrical power steering apparatus is shown, for example, in Japanese Patent Laid-Open Publication No. 59-77966 (1984).

In this prior art apparatus, a steering torque applied to a steering wheel is detected by a steering torque detector, and a steering assisting torque is produced by a motor in accordance with the steering torque detection value. Since the temperature rise of the motor is proportional to the square of a load current, the load current is detected by motor current detection means and the motor is controlled so that the current value does not exceed a predetermined value thereby suppressing the temperature rise.

Furthermore, in such an electrical power steering apparatus, since the motor is driven based on the detection value detected by the steering torque detector, when the steering torque detector is in an abnormal condition and a steering detection value different from the value of the steering torque actually applied to the steering wheel in outputted, the motor will produce an unnecessary assisting torque affecting the driving stability of a vehicle.

For this reason, in the prior art, an abnormality detection device is used to detect whether the output of the steering torque detector is normal or abnormal. This abnormality detection device determines a normal condition and an abnormal condition, and it is determined as being in the normal condition when the output value of the steering torque detector is in a normal range defined by an upper limit value and a lower limit value which are set beforehand, whereas it is determined as the abnormal condition when the output value of the steering torque detector is out of the normal range.

However, in the prior art electrical power steering apparatus, the temperature rise of the motor due to overload is suppressed by detecting a load current of the motor which produces the steering assisting torque. Generally, a relationship between the steering torque applied to the steering wheel and the output voltage of the steering torque detector is represented as shown in FIG. 7. In this relationship, when the steering torque detector is in the normal condition with the steering torque being zero, as shown by the solid line, the output of the steering torque detector is also zero. Thus, the driving current of the motor will be zero to put the motor in a stop driving condition. However, in some cases, due to the influences of a friction or the like in a steering system connected to the steering wheel and/or in the steering torque detector, when the steering torque is zero, the output voltage of the steering torque detector does not become zero as shown by the chain line in FIG. 1. Instead, the steering torque detector exhibits a hysteresis characteristic which is defined as the abnormal condition. When a remaining voltage due to the hysteresis characteristic exceeds a blind band width which is set beforehand near zero steering torque, as shown in FIG. 2 which shows a relationship between the output voltage of the steering torque detector and the motor driving current, the motor will be supplied with a driving current even when the steering wheel is not steered. If this situation is left as it is, there is a possibility that the motor and its control circuit will overheat and burn. However, since the load current of the motor at this time is relatively small and not in the overload condition, it is impossible to detect with the load current detection means. As a result, a problem exists in that the overheating and burning cannot be prevented.

Furthermore, referring to the abnormality detection device of the torque detector in the prior art, since the normal and abnormal conditions of the torque detector are determined merely depending on whether or not the output value of the torque detector is in the normal range defined by the upper limit value and the lower limit value, it is necessary to extend the width of the normal range in order to cope with the non-uniformity of output values due to individual differences of torque detectors. However, when breaking of wire occurs in the applied voltage side of the torque detector, the output value exceeds the upper limit and lower limit values of the normal condition, when short-circuit occurs within the torque detector, a change in the output values will be relatively small. Accordingly, in order to detect both the breaking of wire and short-circuiting, it has been necessary to narrow the range of the output values of the detector, and this in turn requires narrowing the set width of the normal range.

When the torque detector is used in the narrow range of the output values as mentioned above, the anti-noise property is degraded, and at the same time, the mechanical components constituting the torque detector are required to be finished with high accuracy. Thus, another problem arises in that the manufacturing cost in increased.

SUMMARY OF THE INVENTION

The present invention was made in view of the problems in the prior art mentioned above, and it is an object of the invention to provide an electrical power steering apparatus capable of preventing overheating and burning of a motor and a motor driving control circuit by reducing a motor driving current when a condition in which a torque detection value of a steering torque detector does not become zero is continued for a predetermined time period, because of the fact that in the normal travelling condition of a vehicle, straight travelling and turning travelling are repeated.

Another object of the present invention is to provide an abnormality detection device of a torque detector capable of detecting breakage of wire and short-circuit of the torque detector without narrowing a range of output values of the torque detector, thus maintaining a set width of a normal range of the abnormality detection device.

In order to achieve the above objectives, the present invention includes an electrical power steering apparatus having a motor which produces a steering assisting torque in accordance with a steering torque of a steering wheel comprising a steering torque detector for detecting the steering torque of the steering wheel, a motor control circuit for driving and controlling the motor based on a detection value of the steering torque detector, a neutral condition discriminating circuit for discriminating whether the detection value of the steering torque detector is in a neutral condition or not, and a motor protection circuit for decreasing an output current value of the motor control circuit when a non-neutral condition discriminated by the neutral condition discriminating circuit continues for a predetermined time or longer.

Furthermore, the motor control circuit is provided with an abnormality detection circuit for detecting breaking of wire and short-circuiting of the torque detector.

The neutral condition discriminating circuit discriminates whether or not the detection value of the torque detector is in a neutral condition in which the detection value is zero or in the vicinity thereof, and the motor protection circuit decreases an output current of the motor control circuit when the non-neutral condition continues for a predetermined time or longer. By virtue of this, when the steering torque detector is in an abnormal condition, and a detection value equal to a blind band width or larger is outputted from the steering torque detector although the steering torque applied to the steering wheel is zero, it is possible to prevent overheating and burning of the motor and motor control circuit by reducing the driving current of the motor.

On the other hand, when the neutral condition is discriminated by the neutral condition discriminating circuit within a predetermined time period set by the motor protection circuit, the motor protection circuit does not decrease the output current of the motor control circuit, and the motor produces a steering assisting torque in accordance with a normal steering torque detection value.

Moreover, the breaking of wire and short-circuiting can be detected individually by the abnormality detection device, and it is possible to extend the set width defined by the upper limit value and lower limit value for detecting an abnormal output voltage while maintaining the width of the output value of the torque detector.

DESCRIPTION OF THE PREFERRED EMBODIMENTS

Figure 3:
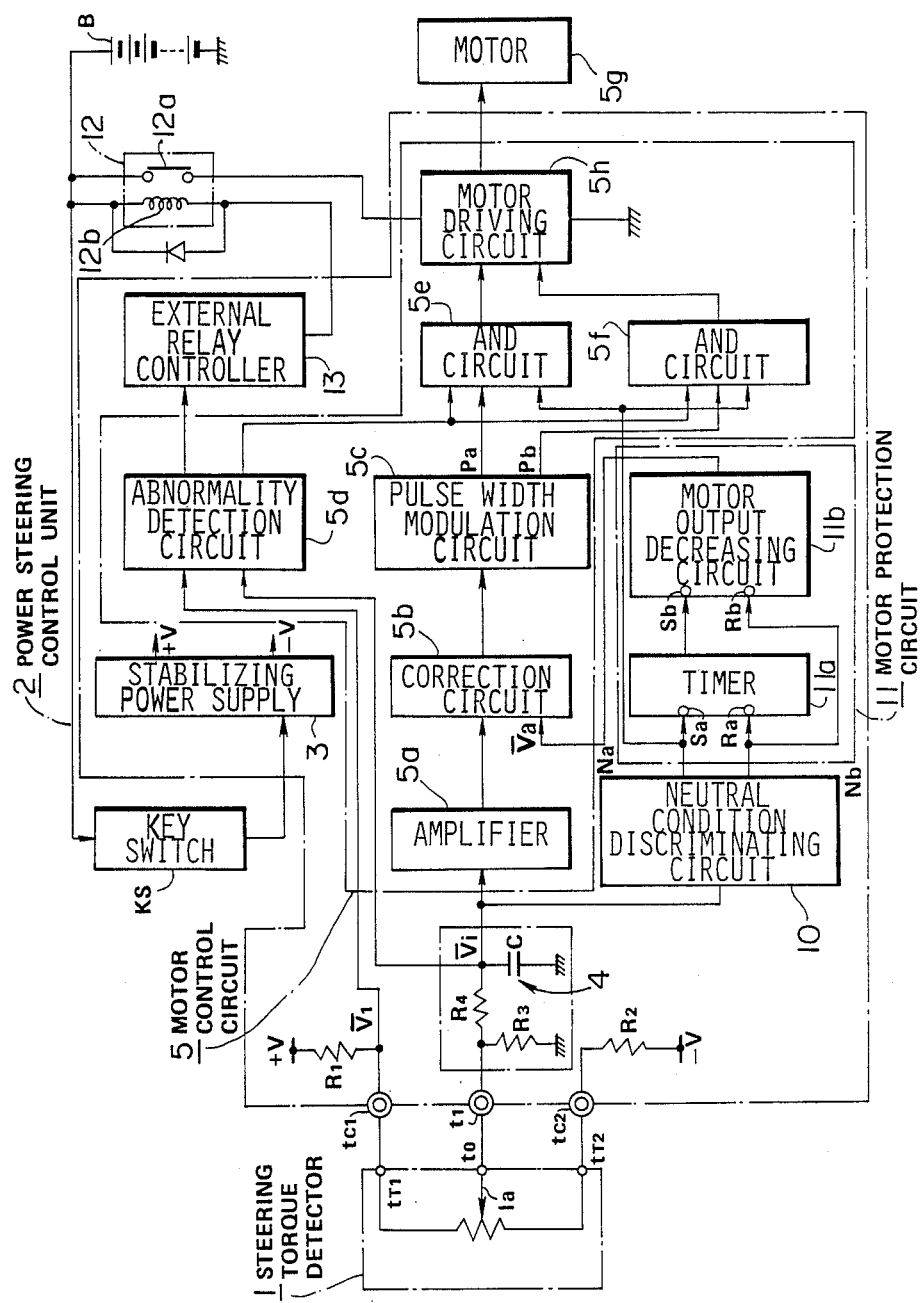
FIG. 3 is a block diagram showing an embodiment of an electrical power steering apparatus in accordance with the present invention.

In FIG. 3, a steering torque detector 1 comprises a potentiometer and detects a steering torque applied to a steering wheel (not shown) from, for example, a torsion angle of a torsion bar coupled between an input shaft connected to the steering wheel and an output shaft connected to a steering gear mechanism. Applied voltage terminals tT1 and tT2, and an output terminal to connected to a movable contact 1a of the steering torque detector 1 are connected to a power steering control unit 2.

The power steering control unit 2 includes a stabilizing power supply circuit 3 which is supplied with power from an external battery B through a key switch KS. From this stabilizing power supply circuit 3, stabilized positive voltage $+\overline{V}$, and negative voltage $-\overline{V}$ are supplied to each internal circuit in the power steering control unit 2. Connection terminals tC1 and tC2 which are connected respectively to the applied voltage terminals tT1 and tT2 of the steering torque detector 1 are applied with the positive voltage $+V$ and negative voltage $-V$ through resistors R1 and R2. The output terminal to of the steering torque detector 1 is connected to an input terminal ti, which is in turn connected to an integration circuit 4 which constitutes a part of an output voltage abnormality detection circuit. The integration circuit 4 includes a resistor R3 whose resistance value is sufficiently large as compared with resistance values of th resistors R1 and R2, and the resistor R3 is connected between the input terminal t1 and ground. The integration circuit 4 further includes a resistor R4 connected to a junction point between the input terminal t1 and the resistor R3, and includes a charging/discharging capacitor C.

The power steering control unit 2 includes a motor control circuit 5 which is supplied with an output voltage $\overline{V}i$ of the integration circuit 4 and a voltage $\overline{V}1$ at a junction point between the resistor R1 and the connection terminal tc1, and includes a neutral condition discriminating circuit 10 which is supplied with the output voltage $\overline{V}i$ of the integration circuit 4.

The motor control circuit 5 includes an amplifier 5a, correction circuit 5b, pulse width modulation circuit 5c, abnormality detection circuit 5d, AND circuits 5e, 5f, and motor driving circuit 5h. The amplifier 5a receives a steering torque detection voltage of the steering torque detector 1 through the integration circuit 4, and the correction circuit 5b corrects the amplified voltage in accordance with an output voltage from a motor protection circuit 11 which will be described later. The pulse width modulation circuit 5c performs pulse modulation by comparing the output voltage of the correction circuit 5b with a saw tooth wave, and delivers an output pulse Pa corresponding to the output voltage of the correction circuit 5b and an inverted output pulse Pb. The abnormality detection circuit 5d detects an abnormal condition of the torque detector 1, and the outputs from the pulse width modulation circuit 5c, abnormality detection circuit 5d, and neutral condition discriminating circuit 10 are fed to the AND circuits 5e and 5f. The outputs of the AND circuits 5e and 5f are supplied to the motor driving circuit 5h which controls a motor 5g connected, for example, to a rack pinion type steering gear.

Figure 4:
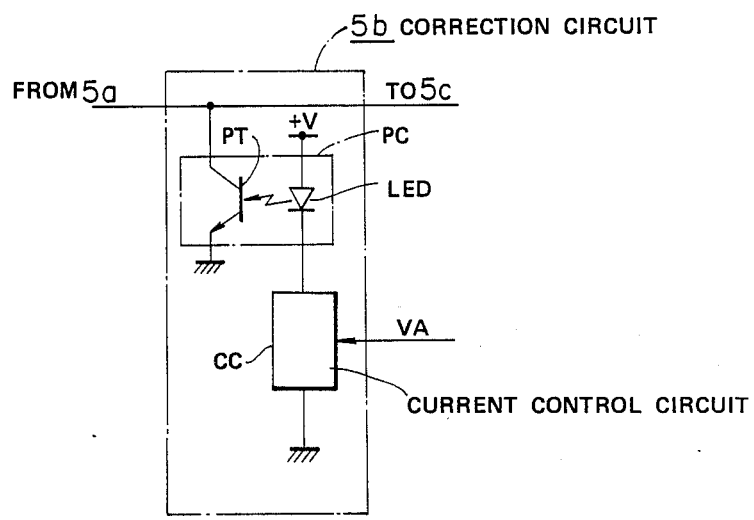
FIG. 4 is a circuit diagram of the correction circuit in FIG. 3.

The correction circuit 5b includes, as shown in FIG. 4, a photo coupler PC which is a combination of a phototransistor PT and a light emitting diode LED. The phototransistor PT is connected between the output of the amplifier 5a and ground, and the light emitting diode LED has an anode connected to the positive power supply and has a cathode connected to ground through a current control circuit CC including transistors, etc. The current control circuit CC is supplied with a correction voltage Va of a motor output decreasing circuit 11b as will be described later, and the amount of current through the current control circuit CC is increased in proportion to the correction voltage Va.

The pulse width modulation circuit 5c has a fundamental frequency selected in a range of about 15~20 kHz which is below the audible range, and outputs the output pulse Pa and its inverted output pulse Pb. The duty ratio of the output pulses is so selected that the duty ratio is 50:50 when the output voltage of the correction circuit is zero volts and the duty ratio fluctuates continuously from 50:50 to 100:0 depending on the voltage value when it is a positive voltage, whereas when it is a negative voltage, the duty ratio fluctuates continuously from 50:50 to 0:100 depending on the voltage value.

Figure 5:
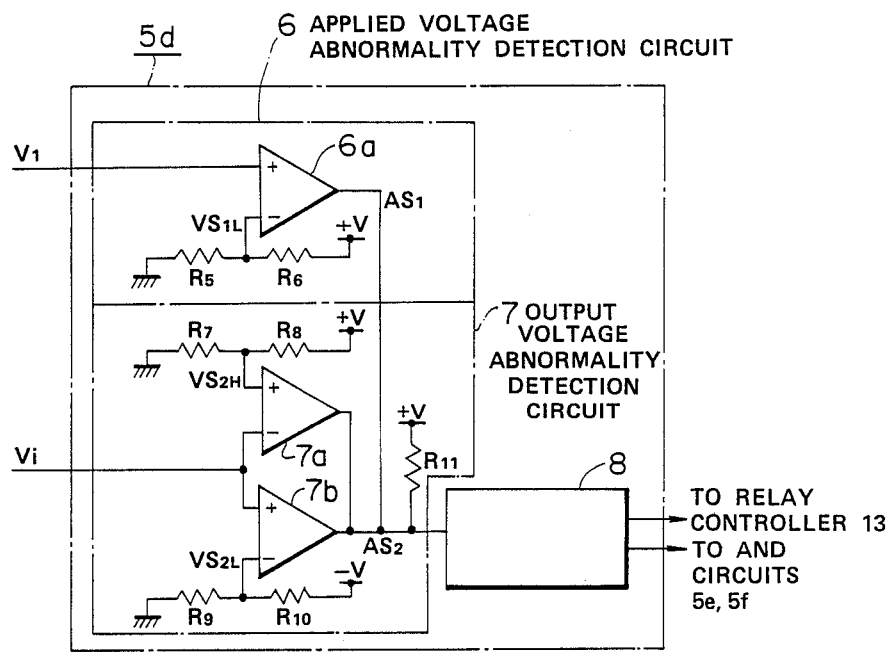
FIG. 5 is a block diagram showing a discrete arrangement of the abnormality detecting circuit in FIG. 3.

The abnormality detection circuit $5d$ includes, as shown in FIG. 5, an applied voltage abnormality detection circuit 6 supplied with the voltage $\overline{V}1$ at the junction point between the resistor R1 and connection terminal tC1, an output voltage abnormality detection circuit 7 supplied with the output voltage $\overline{V}i$ of the integration circuit 4, and a latch circuit 8 which latches the detection voltages of both the circuits 6 and 7.

The applied voltage abnormality detection circuit 6 includes a comparator $6a$ comprising an operational amplifier which receives the voltage $\overline{V}1$ at a non-inverting input terminal and receives a divided voltage as a lower limit set voltage $\overline{VS1L}$ obtained by dividing the positive voltage $+V$ by resistors R5 and R6 at an inverting input terminal. The comparator $6a$ outputs a high level H when the voltage $\overline{V}1$ exceeds the lower limit et voltage $\overline{VS1L}$, and outputs an abnormality detection signal AS1 of a low level when the voltage $\overline{V}1$ is below the lower limit set voltage $\overline{VS1L}$. Here, the lower limit set voltage $\overline{VS1L}$ is selected to be a value which enables detection of a decrease in the voltage $\overline{V}1$ due to a decrease in an internal resistance when short-circuit occurs within the steering torque detector 1.

Figure 1:
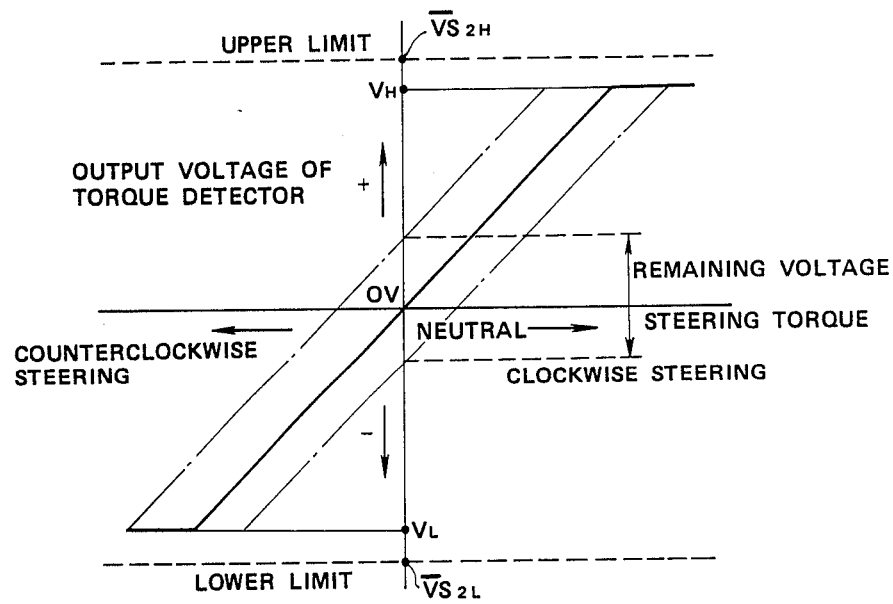
FIG. 1 is a characteristic diagram showing a relationship between a steering torque and an output voltage.
Figure 2:
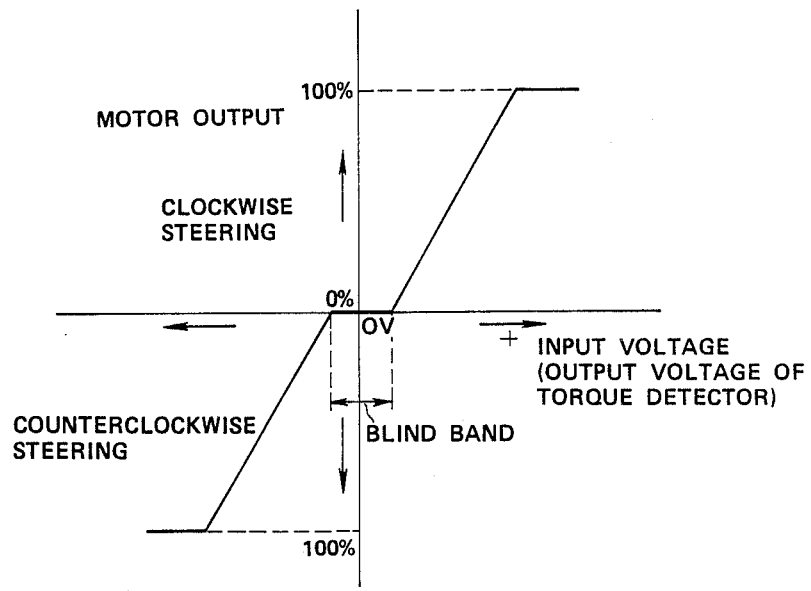
FIG. 2 is a characteristic diagram showing a relationship between an output voltage of a steering torque detector and a motor output.

The output voltage abnormality detection circuit 7 includes a window comparator $7c$ comprising operational amplifiers $7a$ and $7b$. The operational amplifier $7a$ has a non-inverting input terminal receiving a divided voltage as an upper limit set voltage S/2H obtained by dividing the positive voltage $+V$ by resistors R7 and R8 and having an inverting input terminal receiving the voltage $\overline{V}i$. The other operational amplifier $7b$ has a non-inverting input terminal receiving the voltage $\overline{V}i$ and has an inverting input terminal receiving a divided voltage as a lower limit set voltage $\overline{VS2L}$ obtained by dividing the negative voltage $-V$ by resistors R9 and R10. The window comparator $7c$ outputs a detection signal AS2 which is at a high level H when the voltage $\overline{V}i$ satisfies the relationship $\overline{VS2L}<\overline{V}i<\overline{VS2H}$ and it is at a low level when the voltage $\overline{V}i$ satisfies the relationships $\overline{V}i\leqq\overline{VS2L}$, and $\overline{V}i\geqq\overline{VS2H}$. Here, the upper limit set voltage $\overline{VS2H}$ value is selected to be greater than an upper limit value VH, and the lower limit set voltage $\overline{VS2L}$ value is selected to be less than a lower limit value VL, as shown in FIG. 1. Upper and lower limit values VH and VL are outputted from the output terminal to of the steering torque detector 1.

Further, the outputs of both abnormality detection circuits 6 and 7 are connected to each other and are fed to the input of the latch circuit 8, and this input is also connected to the positive voltage $+V$ through a pull-up resistor R11.

Figure 6:
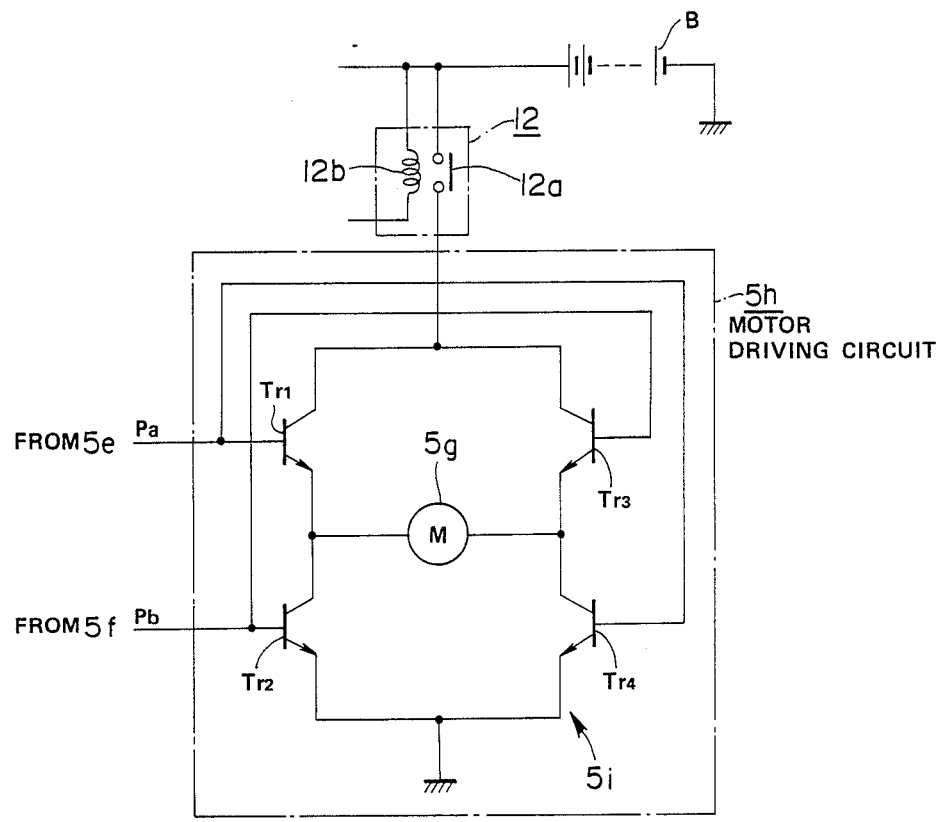
FIG. 6 is a block diagram showing the motor driving circuit in FIG. 3.

The motor driving circuit $5h$ includes, as shown in FIG. 6, a transistor bridge circuit $5i$. The transistor bridge circuit $5i$ has four transistors, Tr1, Tr2, Tr3 and Tr4, with the transistors Tr1 and Tr2 connected in series and the transistors Tr3 and Tr4 connected in series. The two series circuits are connected in parallel to each other and connected to the battery B through a relay contact $12a$ of an external relay 12. The motor $5g$ is connected between a junction point of the transistors Tr1 and Tr2 and a junction point of the transistors Tr3 and Tr4. The bases of the transistors Tr1 and Tr4 are supplied with the output of the AND circuit $5e$ and the bases of the transistors T2 and Tr3 are supplied with the output of the AND circuit $5f$.

The neutral condition discriminating circuit 10 comprises, for example, a window comparator, and outputs a neutral condition discriminating output Na which assumes a logical value "1" when the output voltage of the steering torque detector 1 is in the blind band width near zero, and assumes otherwise a logical value "0." The neutral condition discriminating circuit 10 also outputs another neutral condition discriminating output Nb which is an inverted output of the neutral condition discriminating output Na. Both the discriminating outputs are fed to the motor protection circuit 11, and the discriminating output Na is supplied to the AND circuits $5e$ and $5f$.

The motor protection circuit 11 includes a timer $11a$ and a motor output decreasing circuit $11b$. The timer $11a$ has a set terminal Sa receiving the neutral condition discriminating output Na and a reset terminal Ra receiving the neutral condition discriminating output Nb. The motor output decreasing circuit $11b$ has a set terminal Sb receiving a time-up signal of the timer $11a$ and has a reset terminal Rb receiving the neutral condition discriminating output Nb. Here, the time-up set time of the timer $11a$ is selected to be sufficiently long in a normal travelling condition of the vehicle so that the timer $11a$ is not time up. Furthermore, the motor output decreasing circuit $11b$ includes, for example, a charging/discharging capacitor, and this capacitor begins charging by the time-up signal of the timer $11a$ and discharges rapidly when the neutral condition discriminating output Nb of the neutral condition discriminating circuit 10 is at the logical value "1." A terminal voltage of this capacitor is supplied to the correction circuit $5b$ of the motor control circuit 5 as a correction voltage VA.

The output of the abnormality detection circuit $5d$ is supplied to an external relay controller 13 which controls the external relay 12. A relay coil $12b$ of the external relay 12 is energized when the output of the abnormality detection circuit $5d$ is at the logical value "1" to close the relay contact $12a$. When the output of the abnormality detection circuit $5d$ goes to the logical value "0," the energization of the relay coil $12b$ is interrupted to open the relay contact $12a$, and the supply of power to the motor $5g$ is interrupted.

Next, the operation of the above embodiment will be described. Supposing that the steering torque detector 1 is in a normal condition, the steering torque detector 1 outputs, as shown in FIG. 1, a positive output voltage when the steering wheel is turned clockwise, a negative output voltage when it is turned counterclockwise, and a zero output voltage when it is not steered. The output voltage of the steering torque detector 1 is proportional to a steering torque, but the output voltage never exceeds an upper limit value VH and a lower limit value VL due to the provision of a mechanical stopper in the steering torque detector 1.

As mentioned above, when the torque detector 1 is in the normal condition, since the output voltage of the steering torque detector 1 is neither greater than the upper limit value VH nor less than the lower limit value VL, the terminal voltage $\overline{V}i$ of the charging/discharging capacitor C of the integration circuit 4 in the power steering control unit 2 becomes equal to the output voltage of the steering torque detector 1 and the voltage $\overline{V}i$ is neither greater than the upper limit value VH, nor less than the lower limit value VL. Accordingly, as shown in FIG. 5, at a high level, a detection signal AS2 is outputted from the window comparator 7c of the output voltage abnormality detection circuit 7.

Furthermore, since the steering torque detector 1 is in the normal condition, the voltage $\overline{V}1$ at the junction point between the connection terminal tC1 of the power steering unit 2 and the resistor R1 becomes equal to the divided voltage of the internal resistance of the steering torque detector 1 and the resistor R1. However, since the internal resistance of the steering torque detector 1 is relatively large, the voltage $\overline{V}1$ exceeds the lower limit set voltage $\overline{VS1L}$ of the applied voltage abnormality detection circuit 6 (FIG. 5). As a result, at a high level, the abnormality detection signal AS1 is outputted from the applied voltage detection circuit 6.

Accordingly, the output of the latch circuit 8 which is supplied with the abnormality detection signals AS1 and AS2 from both the abnormality detection circuits 6 and 7 is maintained at a logical value "1," and this output of the latch circuit 8 is supplied to the AND circuits 5e and 5f, and also to the external relay controller 13. Thus, the relay coil 12b of the external relay 12 is energized under the control of the external relay controller 13 to close the contact 12a, and the power from the battery B can be supplied to the motor driving circuit 5h.

In the normal condition of the steering torque detector 1, when the steering wheel is not steered and is in a non-steering condition, the output voltage of the steering torque detector 1 is zero. Thus, since the neutral condition discriminating output Na of the neutral condition discriminating circuit 10 is at the logical value "0," and the neutral condition discriminating output Nb is at the logical value "1," the timer 11a and the motor output decreasing circuit 11b of the motor protection circuit 11 are in a reset condition, and the output voltage of the motor output decreasing circuit 11b is maintained at zero. As a result, the current control circuit CC (FIG. 4) of the correction circuit 5b in the motor control circuit 5 is maintained in an off condition, the light emitting diode LED is extinguished and the phototransistor PT is turned off thereby allowing the output voltage of the amplifier 5a to be outputted unchanged to the pulse width modulation circuit 5c. At this time, since the amplified output of the amplifier 5a of the motor control circuit 5 is zero, the duty ratio of the output pulse Pa of the pulse width modulation circuit 5c is 50:50, and the duty ratio of the inverted output pulse Pb is also 50:50.

On the other hand, since the neutral condition discriminating output Na of the neutral condition discriminating circuit 10 is at the logical value "0," the output pulse cannot be obtained from the AND circuits 5e and 5f, and the transistors Tr1, Tr2, Tr3 and Tr4, when the motor driving circuit 5h is turned off and the motor 5g is in a stopped condition. Thus, the steering assisting torque is never produced.

From this condition, when the steering wheel is turned clockwise or counterclockwise, the output voltage corresponding to the steering torque is outputted from the steering torque detector 1. Until this output voltage exceeds a predetermined value which sets the blind band width of the neutral condition discriminating circuit 10, the neutral condition discriminating output Na is maintained at the logical value "0." Thus, during this time, even when the output pulses Pa and Pb, proportional to the output voltage of the steering torque detector 1, are obtained from the pulse width modulation circuit 5c, no output pulse is obtained from the AND circuits 5e and 5f, and the motor 5g is maintained in the stopped condition.

Thereafter, when the output voltage of the steering torque detector 1 exceeds the set value of the neutral condition discriminating circuit 10, the discriminating output Na is inverted to the logical value "1" and the discriminating output Nb is inverted to the logical value "0". As a result, the output pulses Pa and Pb from the pulse width modulation circuit 5c are outputted from the AND circuits 5e and 5f, and the output pulses are supplied to the motor driving circuit 5h. Thus, the motor 5g is driven into forward rotation by the motor driving circuit 5h, and a predetermined steering assisting torque corresponding to the steering torque is produced.

In this case, when the discriminating output Na of the neutral condition discriminating circuit 10 is inverted to the logical value "1," the timer 11a of the motor protection circuit 11 is set to start the time counting. However, in a usual travelling condition of the vehicle, the straight travelling condition, the condition in which the steering torque is near zero is encountered repeatedly at relatively short time intervals, and when this condition occurs, the discriminating output Nb of the neutral condition discriminating circuit 10 goes to the logical value "1" and the timer 11a is reset. Thus, the time-up output is not delivered and the output of the motor output decreasing circuit 11b is maintained at zero.

However, the output voltage of the steering torque detector 1 exhibits a hysteresis characteristic due to a friction of the steering system or a friction within the steering torque detector 1, as shown by the chain line in FIG. 1, and when the remaining voltage at time zero of the steering torque exceeds the set voltage of the neutral condition discriminating circuit 10, the neutral condition discriminating output Na goes to the logical value "1." Consequently, the output pulse is obtained from the AND circuits 5e and 5f even when the steering wheel is not steered, and this output pulse is inputted to the motor driving circuit 5h. As a result, a driving current proportional to the steering torque output voltage is supplied to the motor 5g, and if this condition is left as it is, the motor and the motor control circuit will overheat and burn.

However, in the present invention, when the discriminating output Na of the neutral condition discriminating circuit 10 is inverted to the logical value "1," the timer 11a of the motor protection circuit 11 is set and the time counting is started. When the time of the timer 11a is up while the logical value "1" of the discriminating output Na is still continued, the time-up signal goes to a logical value "1," and this signal is inputted to the motor output decreasing circuit 11b. Thus, a correction output voltage which increases with time is obtained from the motor output decreasing circuit 11b, and this correction output voltage is supplied to the correction circuit 5b. As a result, the current control circuit CC in the correction circuit 5b is turned on, and the light emitting diode LED emits light with a luminous intensity according to a current proportional to the correction voltage Va. Thus, the phototransistor PT is turned on, and the correction is performed so as to decrease the output voltage of the amplifier 5a with time to zero.

Accordingly, the duty ratio of the output pulses Pa and Pb outputted from the pulse width modulation circuit 5c gradually approaches 50:50, and the effective value of a driving current supplied to the motor 5g is decreased. Thus, the steering assisting torque produced by the motor 5g is also gradually reduced. In this manner, the output of the motor 5g is reduced to the extend that the motor 5g is not overheated even when the motor 5g outputs continuously.

As described above, when the output voltage of the steering torque detector 1 exhibits the hysteresis characteristic, and the logical value "1" of the discrimination output Na of the neutral condition discriminating circuit 10 continues for a period equal to the predetermined time set by the timer 11a or longer, the motor driving current is automatically reduced. As a result, it is possible to prevent the overheating and burning of the motor 5g and its control circuit. Furthermore, in vehicles such as a forklift and the like, in which the battery is used as a power source, the power consumption is saved and the working time can be extended.

When the vehicle starts travelling from the motor stopped condition, and the output voltage of the steering torque detector 1 becomes zero or a value in the blind band width near zero, the discriminating output Na of the neutral condition discriminating circuit 10 is inverted to the logical value "0," and the discriminating output Nb is inverted to the logical value "1." As a result, the timer 11a is reset at this time point, and at the same time, the motor output decreasing circuit 11b is reset to return the output voltage to zero. Accordingly, thereafter, the output voltage of the amplifier 5a amplifying the output voltage of the steering torque detector 1 is outputted from the correction circuit 5b as is, and the output pulse having the duty ratio corresponding to the output voltage of the steering torque detector 1 is outputted from the pulse width modulation circuit 5c. Therefore, it is possible to produce the steering assisting torque substantially corresponding to the steering torque produced by the motor 5g.

Furthermore, in the normal condition of the steering torque detector 1, when the breaking of wire occurs at the side of the applied voltage terminal tT1 (or tT2) in the steering torque detector 1, since the resistance value of resistor R3 connected between the output of the steering torque detector 1 and ground is selected to be sufficiently large as compared with the resistance values of the resistors R1 and R2 connected between the positive voltage +V and the negative voltage -V applied to the steering torque detector 1, the terminal voltage $\overline{V}i$ of the charging/discharging capacitor C of the integration circuit 4 becomes substantially equal to the negative voltage -V (or positive voltage +V), and exceeds the lower limit set voltage $\overline{VS2L}$ (or upper limit set voltage $\overline{VS2H}$). As a result, the output of the operational amplifier 7b (FIG. 5) goes to a low level, and in response, the output of the latch circuit 8 goes to the logical value "1." As a result, the outputting of the output pulses Pa and Pb from the AND circuits 5e and 5f are stopped, and the energization of the relay coil 12b of the external relay 12 is interrupted by the external relay controller 13. Thus, the relay contact 12a is opened to interrupt the supply of the power from the battery B to the motor driving circuit 5h. Consequently, the motor 5g is controlled to a stopped condition, and the production of the steering assisting torque is stopped.

Furthermore, when the breaking of wire occurs between the movable contact 1a and the output terminal to of the steering torque detector 1, the supply of the output voltage to the integration circuit 4 is interrupted. Thus, the electrical charge which has been charged on the charging/discharging capacitor C is discharged gradually through the resistors R4 and R3, and the terminal voltage $\overline{V}i$ of the charging/discharging capacitor C is reduced gradually to zero. When the terminal voltage $\overline{V}i$ becomes zero, the duty ratio of both the output pulses Pa and Pb becomes 50:50, and the discriminating output Na of the neutral condition discriminating circuit 11 goes to the logical value "0." The outputting of the output pulses Pa and Pb from the AND circuits 5e and 5f are stopped, and the driving of the motor 5g is stopped.

Moreover, when the breaking of wires occurs at the side of the applied voltage terminal tT1 and at the side of the applied voltage terminal tT2, simultaneously, the application of the voltage to the steering torque detector 1 is interrupted, and the output voltage from the output terminal to becomes zero. Thus, the charging/discharging capacitor C of the integration circuit 4 is discharged, and the driving of the motor 5g is stopped.

When the short-circuit occurs within the steering torque detector 1, the internal resistance of the steering torque detector 1 becomes apparently small. Since the input voltage $\overline{V}1$ of the applied voltage abnormality detection circuit 6 (FIG. 5) is determined by the ratio of the internal resistance of the steering torque detector 1 and the resistor R1. When the internal resistance is decreased, the voltage $\overline{V}i$ decreases to a value equal to or less than the lower limit set voltage $\overline{VS1L}$. As a result, the abnormality detection signal AS1, outputted from the comparator 6a of the applied voltage abnormality detection circuit 6, goes to the low level, and in response, the latch output of the latch circuit 8 goes to the logical value "0." Thus, the energization of the relay coil 12b of the external relay 12 is interrupted by the external relay controller 13, and the relay contact 12a is opened to thereby interrupt the supply of power to the motor driving circuit 5h. At the same time, the outputting of the output pulses Pa and Pb from the AND circuits 5e and 5f is stopped. Consequently, the driving of the motor 5g is stopped.

As described above, in the embodiment, the short-circuit in the steering torque detector 1 is detected by the applied voltage abnormality detection circuit 6, and the breaking of wire in the steering torque detector 1 is detected by the output voltage detection circuit 7. When the abnormal condition of short-circuit and/or breaking of wire is detected by the abnormality detection circuits 6 and 7, the driving of the motor 5g which produces the steering assisting torque is stopped. Thus, when the abnormal condition occurs in the steering torque detector 1, it is possible to stop with certainty the production of the steering assisting torque which differs from that required in an actual steering condition, and the stabilization of driving of the vehicle can be improved. Furthermore, in the output voltage abnormality detection circuit 7, only the abnormality due to the breaking of wire is detected. In addition, it is possible to set the upper limit set voltage VS2H and the lower limit set voltage $\overline{VS2L}$ to exceed the upper limit value and the lower limit value of the output voltage of the steering torque detector 1 in the normal condition. Accordingly, it is possible to extend a variable range of the output voltage of the steering torque detector 1, and the anti-noise property and durability can be improved and the tolerances in the size of component parts of the steering torque detector 1 can be lowered. At the same time, the erroneous operation of the abnormality detection circuits due to the individual differences of the steering torque detectors can be prevented.

In addition, in the embodiment, the correction voltage which increases with time is generated in the motor output decreasing circuit 11b in the motor protection circuit 11, and the driving current of the motor is decreased gradually. However, the present invention is not limited to this, and the correction circuit 5b and the motor output decreasing circuit 11b may be omitted. Instead, the time-up signal of the timer 11a may be inverted and inputted directly to the AND circuits 5e and 5f so that the output pulses from the AND circuits 5e and 5f are stopped when the time is up in the timer 11a thereby stopping the motor 5g. Furthermore, the motor output decreasing circuit 11b may be omitted, and the correction circuit 5b may be replaced by a selection circuit which selects either the output voltage of the amplifier 5a or a voltage generating circuit which generates a preset voltage for supplying a minute current not affecting the overheating and burning of the motor 5g, so that the selection circuit may switch to the voltage generating circuit when the time is up in the timer 11a.

Furthermore, in the above embodiment, the pulse width modulation circuit 5c in the motor control circuit 5 generates two output pulses Pa and Pb having a duty ratio dependent on the positive and negative input voltages. However, the present invention is not limited to this, and a steering direction discriminating circuit for determining the steering direction, and an absolute value circuit may be provided at the output side of the amplifier 5a. In this arrangement, the absolute value output of the absolute value circuit is supplied to a subtraction circuit whose input side is supplied with the output of the motor output decreasing circuit 11b, and the subtracted output of the subtraction circuit is converted to an output pulse by the pulse width modulation circuit. Then, the output pulse is supplied to the motor driving circuit 5h through an AND circuit, and the motor driving circuit 5h controls the driving direction of the motor 5g based on the result of the determination of the steering direction discriminating circuit.

Furthermore, in the above embodiment, the applied voltage abnormality detection circuit 6 and the output voltage abnormality detection circuit 7 in the abnormality detection circuit 5d consist of comparators and operational amplifiers. However, the present invention is not limited to this, and any arbitrary detection circuit such as other comparators, Schmitt circuit, etc., may be used so far as a change in input voltage can be detected.

As described in the foregoing, in the present invention, the neutral condition discriminating circuit discriminates whether the torque detection value of the steering torque detector is in the neutral condition or not, and when the result of the discrimination indicates that the non-neutral condition continues for a predetermined time, the motor driving current based on the steering torque detection value is decreased by the motor protection circuit. Accordingly, even when the torque detection value of the steering torque detector exhibits a hysteresis characteristic, it is possible to prevent the overheating and burning of the motor and its control circuit without fail, and an extremely safe electrical power steering apparatus can be provided.

Moreover, since the abnormality due to the short-circuit and the abnormality due to the breaking of wire in the steering torque detector are detected individually by the abnormality detection device, the upper limit set voltage and the lower limit set voltage used in detecting the abnormality of the output voltage can be set as a large value. By virtue of this, the upper limit value and the lower limit value of the output voltage of the steering torque detector in the normal condition can be set within a wide range, and the anti-noise property and durability can be improved and the manufacturing costs can be reduced by lowering the tolerance in size of the mechanical parts of the steering torque detector. In addition, it is possible to prevent with certainty the erroneous operation of the abnormality detection circuit due to individual differences of the steering torque detectors.

What is claimed is:

1. An electrical power steering apparatus having a motor for producing a steering assisting torque in accordance with a steering torque of a steering wheel, comprising:
   a steering torque detector for detecting the steering torque of said steering wheel;
   a motor control circuit for driving and controlling said motor based on a detection value of said steering torque detector;
   a neutral condition discriminating circuit for discriminating whether the detection value of said steering torque detector is in a neutral condition or not; and
   a motor protection circuit for decreasing an output current value of said motor control circuit when a non-neutral condition discriminated by said neutral condition discriminating circuit continues for a predetermined time or longer.

2. An electrical power steering apparatus according to claim 1 wherein said motor protection circuit includes a timer which is set when the non-neutral condition is discriminated and is reset when the neutral condition is discriminated by said neutral condition discriminating circuit, and a correction circuit for outputting a correction output which is increased with time to said motor control circuit when the time is up in said timer, and said motor control circuit subtracts said correction output from a control output corresponding to the detection value of said steering torque detector.

3. An electrical power steering apparatus according to claim 2 wherein said motor control circuit makes the output power value zero when the subtracted output obtained by subtracting the correction output from the control output corresponding to the detection value of said steering torque detector is zero or a negative value.

4. An electrical power steering apparatus according to claim 1 wherein said motor control circuit includes an abnormality detection circuit for detecting an abnormal condition of said steering torque detector.

5. An electrical power steering apparatus according to claim 4 wherein said abnormality detection circuit includes an output voltage abnormality detection circuit for discriminating whether the output voltage of said torque detector is in a predetermined set range or not and for outputting an abnormal condition detection signal when the output voltage is outside the predetermined set range by deciding that breaking of wire is present in said steering torque detector, and an applied voltage abnormality detection circuit for outputting an abnormal condition detection signal when an applied voltage applied to said steering torque detector is lower than a reference value by deciding that short-circuit is present in said steering torque detector.

* * * * *